United States Patent
Naka et al.

(10) Patent No.: US 7,242,718 B2
(45) Date of Patent: Jul. 10, 2007

(54) CODING STANDARD SELECTING METHOD AND TERMINAL DEVICE

(75) Inventors: Nobuhiko Naka, Yokohama (JP); Takashi Suzuki, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 645 days.

(21) Appl. No.: 10/474,348

(22) PCT Filed: Sep. 3, 2002

(86) PCT No.: PCT/JP02/08947

§ 371 (c)(1),
(2), (4) Date: Oct. 8, 2003

(87) PCT Pub. No.: WO03/021911

PCT Pub. Date: Mar. 13, 2003

(65) Prior Publication Data

US 2004/0114532 A1   Jun. 17, 2004

(30) Foreign Application Priority Data

Sep. 4, 2001 (JP) .............................. 2001-267490

(51) Int. Cl.
*H04B 14/04* (2006.01)

(52) U.S. Cl. ..................................... 375/242; 375/252

(58) Field of Classification Search ................ 375/242, 375/252

See application file for complete search history.

(56) References Cited

U.S. PATENT DOCUMENTS 4,613,980 A * 9/1986 Newlin et al. ............... 375/368
2004/0047437 A1 * 3/2004 Hamiti et al. ............... 375/326

FOREIGN PATENT DOCUMENTS

| JP | 1-115242 | 5/1989 |
| JP | 8-167985 | 6/1996 |
| JP | 11-261664 | 9/1999 |
| JP | 2003-218952 | 7/2003 |

* cited by examiner

*Primary Examiner*—Jean B. Corrielus
*Assistant Examiner*—Nader Bolourchi
(74) *Attorney, Agent, or Firm*—Oblon, Spivak, McClelland, Maier & Neustadt, P.C.

(57) ABSTRACT

A coding standard selecting method for selecting a coding standard used for communications between a first terminal and a second terminal, each terminal supporting multiple coding standards, is disclosed. The first terminal transmits a first signal representing all the coding standards supported by the first terminal itself to the second terminal. The second terminal selects a set of coding standards that satisfies a predetermined condition from among the coding standards represented by the first signal and among the coding standards supported by the second terminal itself, and transmits a second signal representing the selected set of coding standards to the first terminal. The first terminal selects a coding standard to be used for communication with the second terminal from the set of coding standards represented by the second signal, and transmits a third signal representing the selected coding standard to the second terminal.

11 Claims, 13 Drawing Sheets

FIG.1

BACKGROUND ART

| MODE | LSCS | LACS | DACS | DSCS |
|---|---|---|---|---|
| 0 | O | O | O | O |
| 1 | O |   | O | O |
| 2 | O |   | O | O |
| 3 | O |   |   |   |
| 4 | O | O | O | O |
| 5 | O |   |   |   |
| 6 |   |   |   |   |
| 7 |   |   |   | O |

FIG.2

BACKGROUND ART

| MODE | LSCS | LACS | DACS | DSCS |
|---|---|---|---|---|
| 0 | O | | O | O |
| 1 | O | | O | O |
| 2 | O | | O | O |
| 3 | O | O | | |
| 4 | O | | O | O |
| 5 | O | O | | |
| 6 | | | | |
| 7 | | | | O |

FIG.7

| MODE | LSCS | LACS | DACS | DSCS | CSCS |
|------|------|------|------|------|------|
| 0 | ○ | ⊙ | ⊙ | ○ | ○ |
| 1 | ○ |  |  | ○ | ○ |
| 2 | ○ |  |  | ○ | ○ |
| 3 | ○ |  |  |  |  |
| 4 | ○ | ⊙ | ⊙ | ○ | ○ |
| 5 | ○ |  |  |  |  |
| 6 |  |  |  |  |  |
| 7 |  |  |  | ○ |  |

(CONSISTENT) — LACS ↔ DACS (CONSISTENT)

| MODE | LSCS_t | LSCS_NW | LACS | DACS | DSCS_NW | DSCS_t | CSCS |
|------|--------|---------|------|------|---------|--------|------|
| 0 | ○ | ○ | | | | | |
| 1 | ○ | ○ | ○ | ○ | ○ | ○ | ○ |
| 2 | ○ | ○ | ⊙ | ⊙ | ○ | ○ | ○ |
| 3 | ○ | ○ | | | | ○ | |
| 4 | ○ | ○ | | | ○ | ○ | ○ |
| 5 | ○ | ○ | | | | ○ | |
| 6 | ○ | | | | | ○ | |
| 7 | ○ | | | | ○ | ○ | |

LSCS_t: MODE SUPPORTED BY TERMINAL 1
LSCS_NW: MODE SUPPORTED BY NETWORK A CONNECTED TO TERMINAL 1
DSCS_NW: MODE SUPPORTED BY TERMINAL 2
DSCS_t: MODE SUPPORTED BY NETWORK B CONNECTED TO TERMINAL 2

CODING STANDARD SELECTING METHOD AND TERMINAL DEVICE

TECHNICAL FIELD

The present invention generally relates to a coding standard selecting method, and more particularly to a method for selecting through negotiation the optimum coding standard consistent between a transmitting terminal and a receiving terminal, even if the coding standards supported by the terminals are not totally consistent with effective sets of coding standards actually available at these terminals at the time of telecommunicating.

BACKGROUND ART

In recent years, VoIP telecommunication (e.g., a telephone call over the Internet) or multi-media telecommunication using ITU-T Recommendation H.323, or SIP (Session Initiation Protocol) based on IETF RFC 2543, has been continuously spreading widely. Some terminal devices and network devices (e.g., gateway devices) used in such a telecommunications system are implemented with various coding standards. For instance, a device may be furnished with coding standards of 8 Kbps (G.729), 16 Kbps (G.728), and 32 Kbps (G.726). By implementing multiple coding standards in a terminal device or a network device, the optimum coding standard can be selected among them, taking into account, for example, the use, the purpose, the speech quality, and the transmission capacity of the communication channel.

However, since there is generally no compatibility between different types of coding-standards, the coding standard used in the receiving side terminal and that used in the transmitting side terminal have to match with each other. Currently, ITU-T Recommendation H.245 and SDP (Session Description Protocol) based on IETF RFC 2327 define procedures for choosing the same coding standard on the transmitting side and the receiving side. These protocols include a negotiation protocol for selecting a coding standard at the beginning of or during the voice communication. Explanation is made below of such a conventional negotiation procedure carried out on the receiving side, using an example of SDP based on IETF RFC 2327.

First, a terminal on the transmission side describes available coding standards (definitions of the media used for voice communication) and the associated parameters, as well as the addresses of the caller and the callee, with SDP in an INVITE message of SIP, and transmits the INVITE message. This INVITE message contains information about multiple coding standards described with SDP. The terminal on the receiving side receives the SDP, and transmits data using an available coding standard selected from the multiple coding standards described with SDP. In this manner, voice communication is started between the transmission side and the receiving side, using the selected coding standard.

There are some coding standards that define various options. In this case, a determination has to be made during the negotiation whether to use these options, in order to select an appropriate coding standard. For instance, it is known that AMR (adaptive multi-rate) speech coding standard defined by ETSI (European Telecommunication Standards Institute)/3GPP ($3^{rd}$ generation partnership project) includes eight (8) coding modes. These coding modes can be selected and changed dynamically according to the communication environment. It is not necessary to use all of the eight coding modes, and voice communication is possible using a part of them. The transmission rates of the eight coding modes of the AMR speech coding standard are listed below.

Coding Mode 1: 12.2 Kbit/s
Coding Mode 2: 10.2 Kbit/s
Coding Mode 3: 7.95 Kbit/s
Coding Mode 4: 7.40 Kbit/s
Coding Mode 5: 6.70 Kbit/s
Coding Mode 6: 5.90 Kbit/s
Coding Mode 7: 5.15 Kbit/s
Coding Mode 8: 4.75 Kbit/s One example of a mobile communication system using the AMR speech coding standard is GSM (global system for mobile communication) standardized in Europe. In GSM, the maximum number of modes available in voice communication is limited by various factors. For example, the maximum number of available modes is limited to four (4) due to the conditions of the network resources and other factors. Consequently, a combination of modes used in voice communication has to be determined. In addition, when conducting telecommunications between terminals (i.e., mobile terminals in this context), the same combination of modes has to be used in both directions. For these reasons, coding modes have to be determined taking these restrictive conditions into account in GSM. However, the above-described negotiation procedure based on SDP has some problems, which are explained below using FIG. 1 and FIG. 2.

FIG. 1 and FIG. 2 illustrate the case in which the coding modes supported by the transmitting terminal and the receiving terminal differ from those actually available at the time of telecommunicating. In tables shown in FIG. 1 and FIG. 2, LSCS (local supported codec set) and DSCS (distant supported codec set) are the coding modes of AMR available at terminal 1 (e.g., the caller's terminal) and terminal 2 (e.g., the callee's terminal), respectively. LACS (local active codec set) and DACS (distant active codec set) make a pair of mode sets having been actually used at terminal 1 and terminal 2 prior to the negotiation. In this example, it is presumed that terminal 1 calls terminal 2.

In FIG. 1, terminal 1 describes LSCS using SDP in an INVITE message, and transmits this message to terminal 2. The LSCS indicates that six modes (coding modes 0 through 5) are supported at terminal 1. Upon receiving LSCS, terminal 2 selects the coding modes that are common between the six modes transmitted from terminal 1 and five coding modes (coding modes 0-2, 4, and 7) supported at terminal 2 itself. Then, terminal 2 transmits the common coding modes DACS to terminal 1. However, the coding mode set LACS that is actually available at terminal 1 at this moment is limited to coding mode 0 and mode 4, as indicated in FIG. 1. In this case, the terminal 1 cannot receive the response in coding mode 1 or 2. Thus, if the coding modes supported at terminal 1 are limited due to some restrictive factors, then terminal 1 cannot receive messages if they are encoded with a coding standard other than the actually available LACSs. In this case, voice communication may not be conducted.

FIG. 2 illustrates another example. In this example, terminal 1 describes LACS using SDP in the INVITE message and transmits the message to terminal 2. The terminal 2 is capable of communicating with terminal 1 using common coding modes (modes 0, 1, 2, and 4 in this example, which are in common between LSCS and DSCS). However, terminal 1, which first generates and transmits LACS in this example, may select and transmit modes 3 or 5 as the LACS to terminal 2. Then, terminal 2 cannot receive the data encoded by mode 3 or 5, in spite of the face that there are common coding mode existing between terminal 1 and terminal 2. This case also prevents voice communication between end terminals.

These problems also occur using the H.245 standard.

SUMMARY OF THE INVENTION

Therefore, it is an object of the present invention to provide a coding standard selecting method for selecting the optimum coding standard consistent between terminals through negotiation, even if effective coding standards (LACS and DACS) actually available at the terminals at the time of telecommunicating are not totally identical to the coding standards supported by the respective terminals.

It is another object of the present invention to provide a terminal device that is capable of telecommunicating (including speech/audio communication) using the coding standard selecting method.

To achieve the objects, in one aspect of the invention, a coding standard selecting method for selecting a coding standard in use for communications between a first terminal and a second terminal, each supporting a plurality of coding standards, is provided. In this method, the first terminal transmits a first signal representing all the coding standards supported by the first terminal, to the second terminal. The second terminal selects a set of coding standards that satisfies a predetermined condition from among the coding standards represented by the first signal and among the coding standards supported by the second terminal itself. Then, the second terminal transmits a second signal representing the selected set of coding standards to the first terminal. The first terminal selects a coding standard that is to be used for communication with the second terminal from the set of coding standards represented by the second signal, and transmits a third signal representing the finally selected coding standard to the second terminal.

With this method, the second terminal returns DACS, which represents a logical multiplication of LSCS (all the coding standards supported by the first terminal) and DSCS (all the coding standards supported by the second terminal), to the first terminal. The first terminal selects a currently available coding standard from the DACS, taking into account the restrictive conditions and other factors, and informs the second terminal of the selection result. In this manner, even if the coding standards supported by the terminals differ from those actually available at the time of telecommunicating due to various restrictive factors, LACS and DACS can be made consistent with each other between the first and second terminals, respectively. Information is generated using the selected coding standard that is active at both terminals, and consequently, a call is put through (successfully established) between the two terminals without fail. Accordingly, reliable services including voice communication can be offered to the users of the terminals.

In the second aspect of the invention, a terminal device that implements the above-described coding standard selecting method is provided.

Other objects, features, and advantages of the invention will become more apparent from the following detailed description when read in conjunction with the accompanying drawings.

BRIEF DESCRIPTION OF THE DRAWINGS

FIG. 1 illustrates an example of inconsistency between coding standards supported by transmitting and receiving terminal devices and coding standards actually available at the terminal devices at the time of telecommunicating;

FIG. 2 illustrates another example of inconsistency between coding standard supported by transmitting and receiving terminal devices and coding standards actually available at the terminal devices at the time of telecommunicating;

FIG. 7 illustrates the negotiation result carried out between terminals in connection state 1 shown in FIG. 3 according to the coding standard selecting method of the embodiment of the invention;

BEST MODE TO CARRY OUT THE INVENTION

Embodiments to implement the present invention will now be described below with reference to the attached drawings. In the following description, "coding mode" is used as being synonymous with "coding standard". However, in the actual system, a coding standard may be distinguished from a coding mode because, in some system, multiple coding modes are included in a single coding standard. Therefore, the "coding standard" described in this patent application may correspond to a coding mode used in an actual system.

Figure 3:
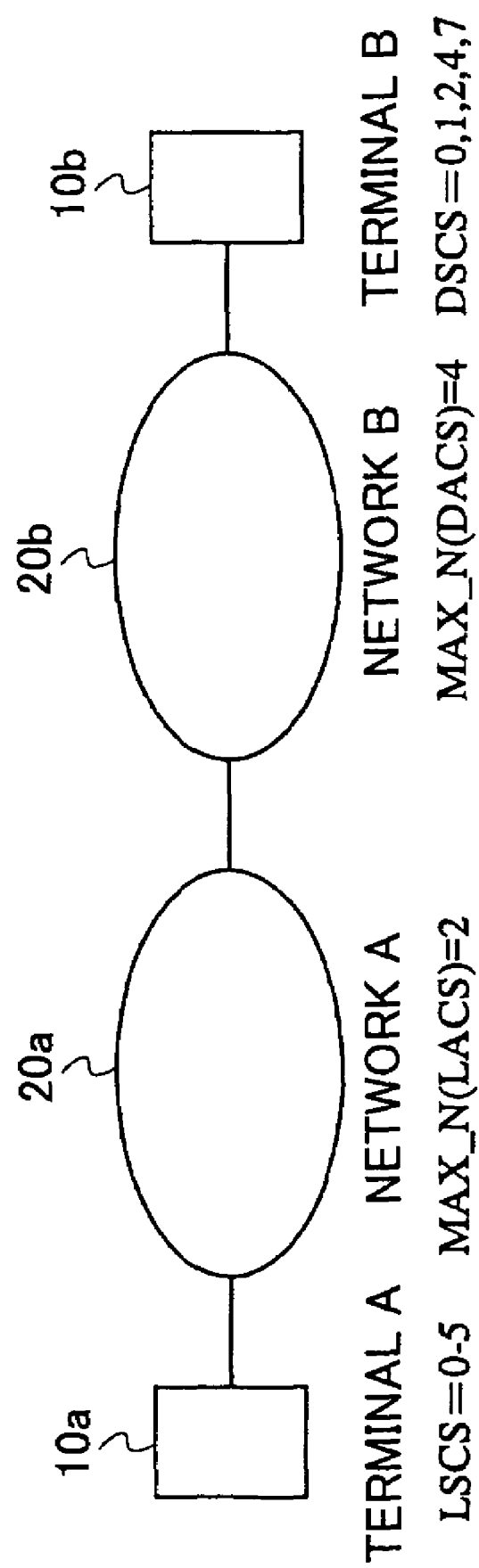
FIG. 3 illustrates an example (connections state 1) of the telecommunications system to which the coding standard selecting method is applied according to an embodiment of the invention.
Figure 4:
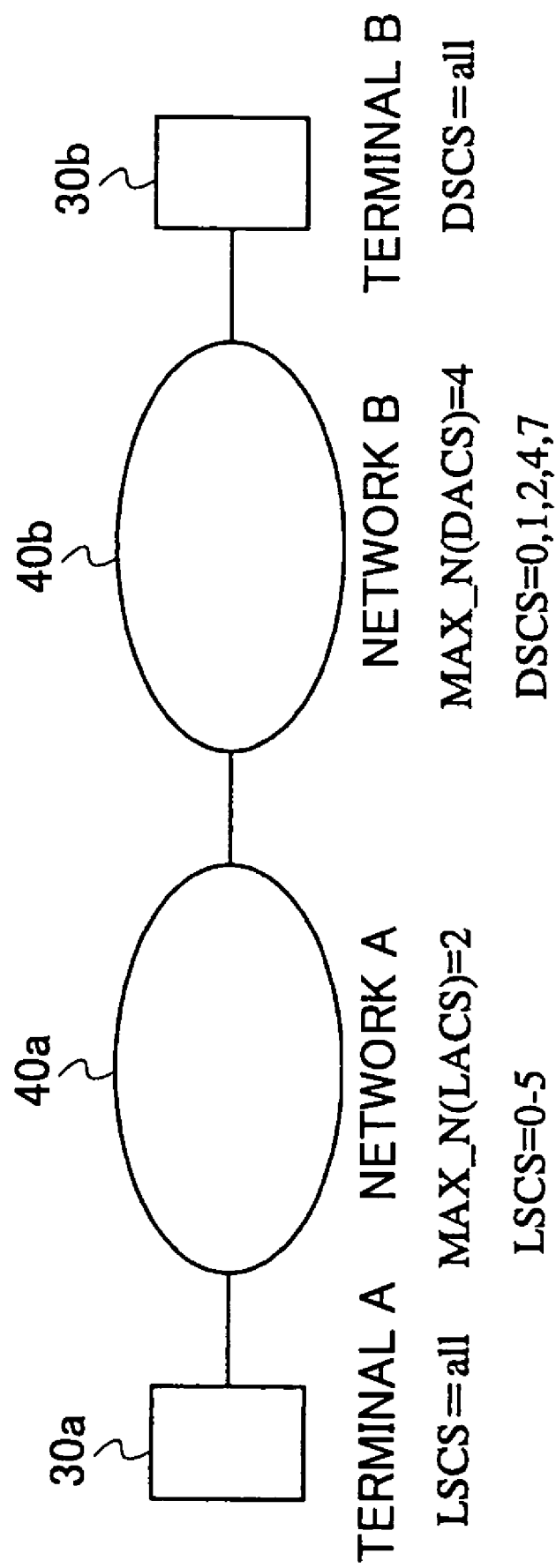
FIG. 4 illustrates another example (connection state 2) of the telecommunications system to which the coding standard selecting method is applied according to the embodiment of the invention.

FIG. 3 and FIG. 4 illustrate examples of the telecommunications system to which the coding standard selecting method of the present invention is applied, according to an embodiment of the invention.

In FIG. 3, there are two relay nodes, namely, a network A (20a) (an IP network, for example) and a network B (20b) (an IP network, for example) existing between a terminal device 10a (referred to as "terminal A") and a terminal device 10b (referred to as "terminal B"). Voice signals are transmitted as packets from terminal A (e.g., a caller's terminal) to the counterpart terminal B (e.g., a callee's terminal), via the network A (20a) and network B (20b). The terminal B (10b) assembles the packets, and voice communication (VoIP communication) is performed between terminal A (10a) and terminal B (10b). Network A (20a) and network B (20b) may be provided by a single telecommunications carrier, or alternatively, these networks may be provided by different telecommunications carriers. The terminal devices A and B (10a and 10b) may be provided with a function of packetizing voice, like an IP-capable cellular phone, for example.

FIG. 3 illustrates an example of a connection state of the telecommunications system according to an embodiment of the invention.

In the connection state (i.e., connection state 1) shown in FIG. 3, the number of coding modes supported by each of terminal A (10a) and terminal B (10b) is limited, and the maximum number of coding modes available at network A (20a) and network B (20b) is also limited. The coding modes may include video codec, in addition to speech codec. To be more precise, the following conditions are given:

(1) The coding modes supported by terminal A (10a) are limited to modes 0 through 5 (LSCS=0-5);
(2) The coding modes supported by terminal B (10b) are limited to modes 0, 1, 2, 4, and 7 (DSCS=0, 1, 2, 4, and 7);
(3) The maximum number of modes available at network A (20a) is limited to two (MAX_N(LACS)=2); and
(4) The maximum number of modes available at network B (20b) is limited to four (MAX_N(DACS)=4).

On the other hand, in connection state 2 shown in FIG. 4, terminal A (30a) and terminal B (30b) support all the coding modes; however, the coding modes supported by network A (40a) and network B (40b) are limited, and in addition, the maximum number of coding modes available at these networks is limited. To be more precise, the following conditions are given:

(1) Terminal A (30a) and terminal B (30b) support all the coding modes (LSCS=all, DSCS=all), respectively;
(2) The coding modes supported by network A (40a) are limited to modes 0 through 5 (LSCS=0-5), and the maximum number of modes available at network A is limited to two (MAX_N(LACS)=2); and
(3) The coding modes supported by network B (40b) are limited to modes 0, 1, 2, 4, and 7 (DSCS=0, 1, 2, 4, and 7), and the maximum number of modes available at network B is limited to four (MAX_N(DACS)=4).

When the coding mode set supported by a terminal is not identical to the actually available (effective) coding mode set at the time of telecommunicating, as illustrated in connection states 1 and 2, the conventional technique has a problem in that voice communication may not be conducted between terminals A (10a) and B (10b), or between terminals A (30a) and B (30b). This problem can be solved by implementing the coding standard selecting method of the present invention at terminal A (10a, 30a) and terminal B (10b, 30b).

The procedure of the coding standard selecting method to solve the above-described problem is explained below in detail, with reference to the flowchart shown in FIG. 5. In this example, voice communication is conducted based on the AMR standard that includes a plurality of coding modes, and it is presumed that terminal 1 (that is, terminal A denoted by 10a, 30a) makes a call to terminal 2 (that is, terminal B denoted by 10b and 30b). Symbols N( ) and MAX_N( ) shown in the flowchart denote the number of modes and the maximum number of modes, respectively, contained in the mode set represented in the parenthesis.

Figure 5:
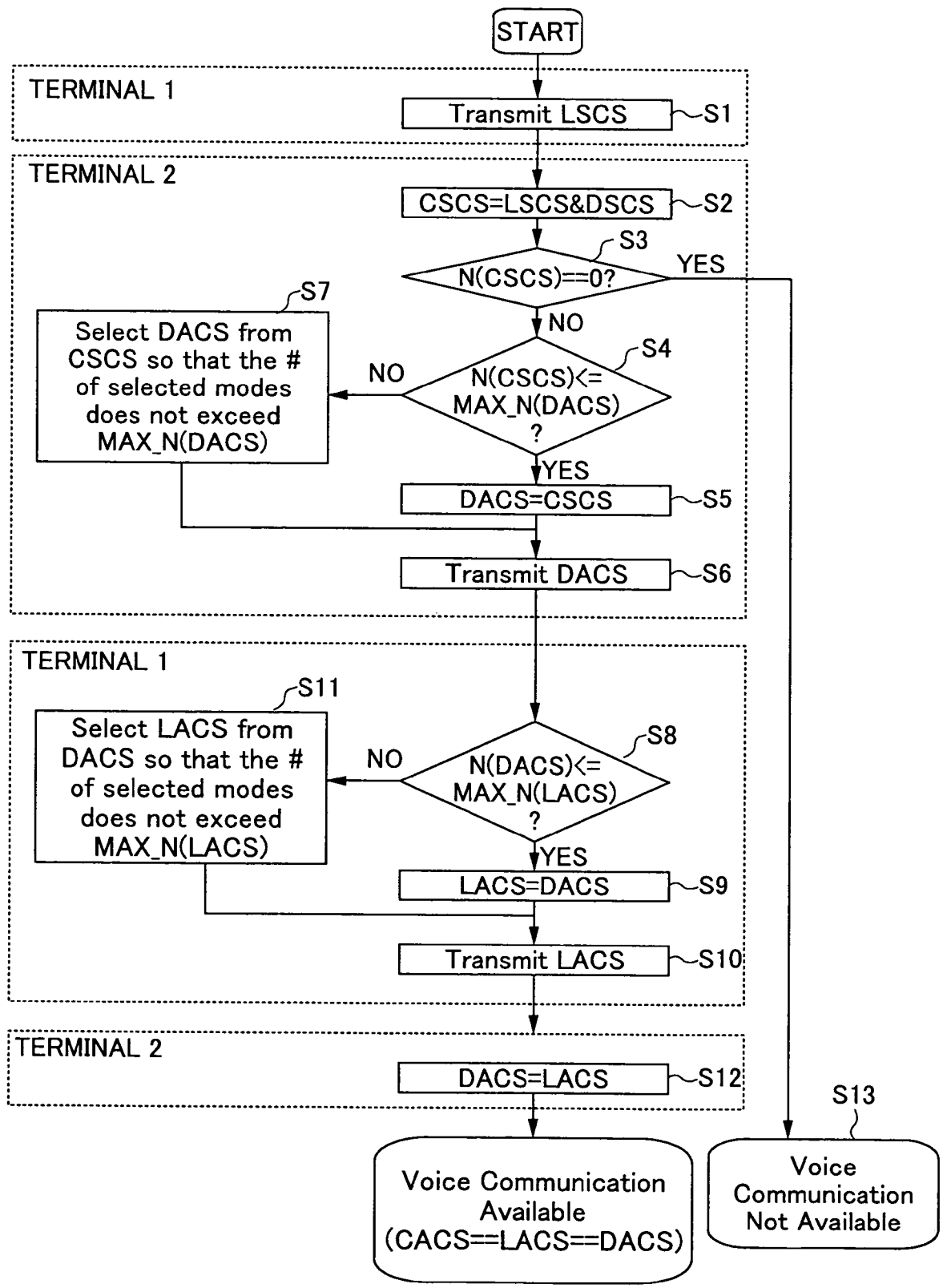
FIG. 5 is a flowchart showing the operation flow of the coding standard selecting method according to an embodiment of the invention.

In FIG. 5, terminal 1 transmits all the coding modes (that is, all the AMR coding modes in this example) supported by terminal 1 itself, denoted as LSCS, to terminal 2, prior to starting telecommunications, including voice communications (step S1). Upon receiving LSCS, terminal 2 determines a common part (CSCS: common supported codec set) between LSCS received from terminal 1 and all the AMR coding modes (DSCS) supported by terminal 2 itself (step S2).

Then, it is determined whether the number of the common modes contained in CSCS (N(CSCS)) is zero (step S3). If the number of the common modes is zero (YES in S3), voice communication cannot be conducted because of lack of a coding mode in common between terminal 1 and terminal 2 (step S13). In this case, coding conversion is carried out on the network to save the call, or alternatively, the negotiation is disconnected and further negotiation with other coding modes may be conducted.

On the other hand, if the number of common modes is not zero (NO in S3), the process proceeds to the next step (step S4) to determine whether or not the number of modes contained in CSCS (N(CSCS)) is equal to or less than the maximum number of modes currently available at terminal 2 (MAX_N(DACS)). If the number of modes contained in CSCS (N(CSCS)) is equal to or less than the maximum number of modes currently available at terminal 2 (MAX_N (DACS)) (YES in S4), DACS is set to CSCS (step S5), and this updated DACS is transmitted to terminal 1 (step S6). On the other hand, if the number of modes contained in CSCS (N(CSCS)) exceeds the maximum number of modes currently available at terminal 2 (MAX_N(DACS)) (NO in S4), then some of the coding modes are selected from CSCS so that the number of selected modes does not exceed MAX_N (DACS) (step S7). A set of the selected modes is transmitted as DACS to terminal 1 (step S6).

Upon receiving DACS from terminal 2, terminal 1 determines whether the number of modes contained in the DACS (N(DACS)) is equal to or less than the maximum number of coding modes currently available at terminal 1 (MAX_N (LACS)) (step S8). If the number of modes contained in the DACS (N(DACS)) is equal to or less than MAX_N(LACS), which is the maximum number of coding modes currently available at terminal 1 (YES in S8), LACS is set equal to DACS (step S9), and this updated LACS is transmitted to terminal 2 (step S10). On the other hand, if the number of modes contained in the DACS (N(DACS)) exceeds MAX_N (LACS) (NO in S8), then some of the coding modes are selected from DACS so that the number of selected modes does not exceed MAX_N(LACS) (step S11). A set of the selected modes is transmitted as LACS to terminal 2 (step S10). Since DACS transmitted from terminal 2 defines the common part between DSCS and LSCS, the coding modes contained in DACS are always supported by terminal 1.

Upon receiving LACS from terminal 1, terminal 2 updates the DACS by setting the DACS equal to LACS (step S12), and starts voice communications with terminal 1.

In this manner, with the coding standard selecting method according to this embodiment, DACS is generated by selecting those coding modes supported in common between terminal 1 and terminal 2, and then, LACS is selected from the DACS, through negotiation between terminal 1 and terminal 2. Consequently, the coding modes that terminal 1 wants to activate can be matched with the coding modes that terminal 2 wants to activate. This arrangement allows a call to be put through between terminal 1 and terminal 2 in a reliable manner, even in the connection state 1. (FIG. 3) or connection state 2 (FIG. 4) where the coding mode sets supported at terminals 1 and 2 differ from the effective sets of coding modes actually available at the time of telecommunicating. As a result, reliable voice communication services can be offered to the users of the terminal.

In the above-describe example, negotiation is carried out before voice communication is started; however, the negotiation may be performed during voice communication.

In addition, the present invention is not limited to connection between end terminals via the network, but is equally applicable to connection in a relay section (or at a relay node), where a set of coding modes supported by the relay node does not agree with the effective set of coding modes actually available at the time of connection. In this case, respective sets of information (including LSCS and DACS) are updated at the relay node (or in the network device, such a switching device).

Figure 6:
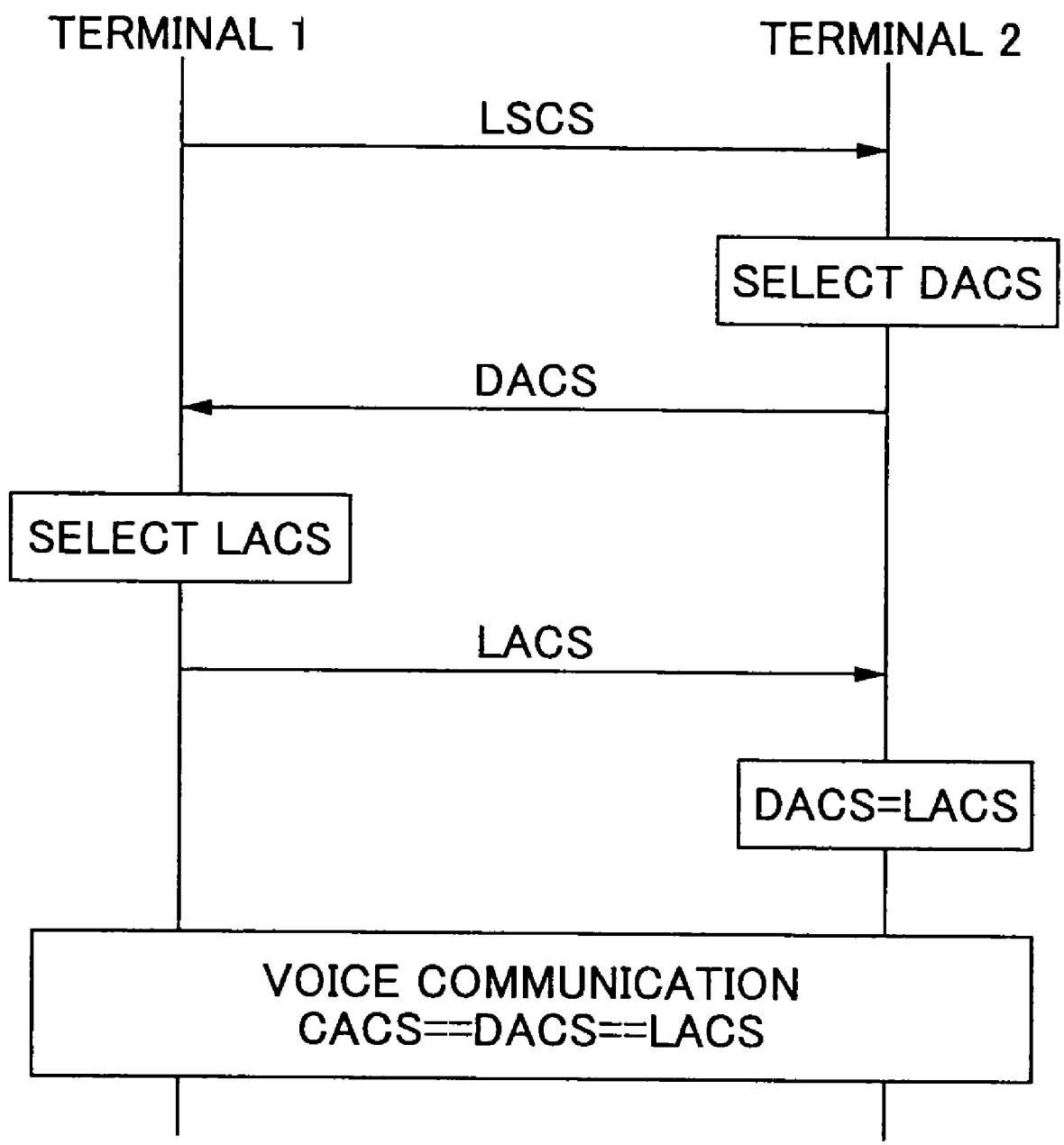
FIG. 6 is a sequence diagram of signal exchange between terminals based on the coding standard selecting method according to the embodiment of the invention.

FIG. 6 is a sequence diagram showing the sequence of signal transmission between terminal 1 and terminal 2 according to the above-described embodiment.

Terminal 1 transmits LSCS to terminal 2. The transmission of LSCS corresponds to step S1 of the operation flow shown in FIG. 5. Terminal 2 selects DACS based on the received LSCS, and transmits DACS to terminal 2. This procedure corresponds to the steps S2 through S7 shown in FIG. 5. Then, terminal 1 select LACS based on the received DACS, and transmits LACS to terminal 2. This procedure corresponds to steps S8 through S11 shown in FIG. 5. DACS is set equal to the LACS received at the terminal 2 (as in step S12 shown in FIG. 5), and then voice communication is started. At this time, the relation CACS=DACS=LACS holds.

FIG. 7 illustrates the negotiation result carried out between terminal 1 and terminal 2 in the connection state 1 shown in FIG. 3, based on the coding standard selecting method according to an embodiment of the invention.

Figure 11:
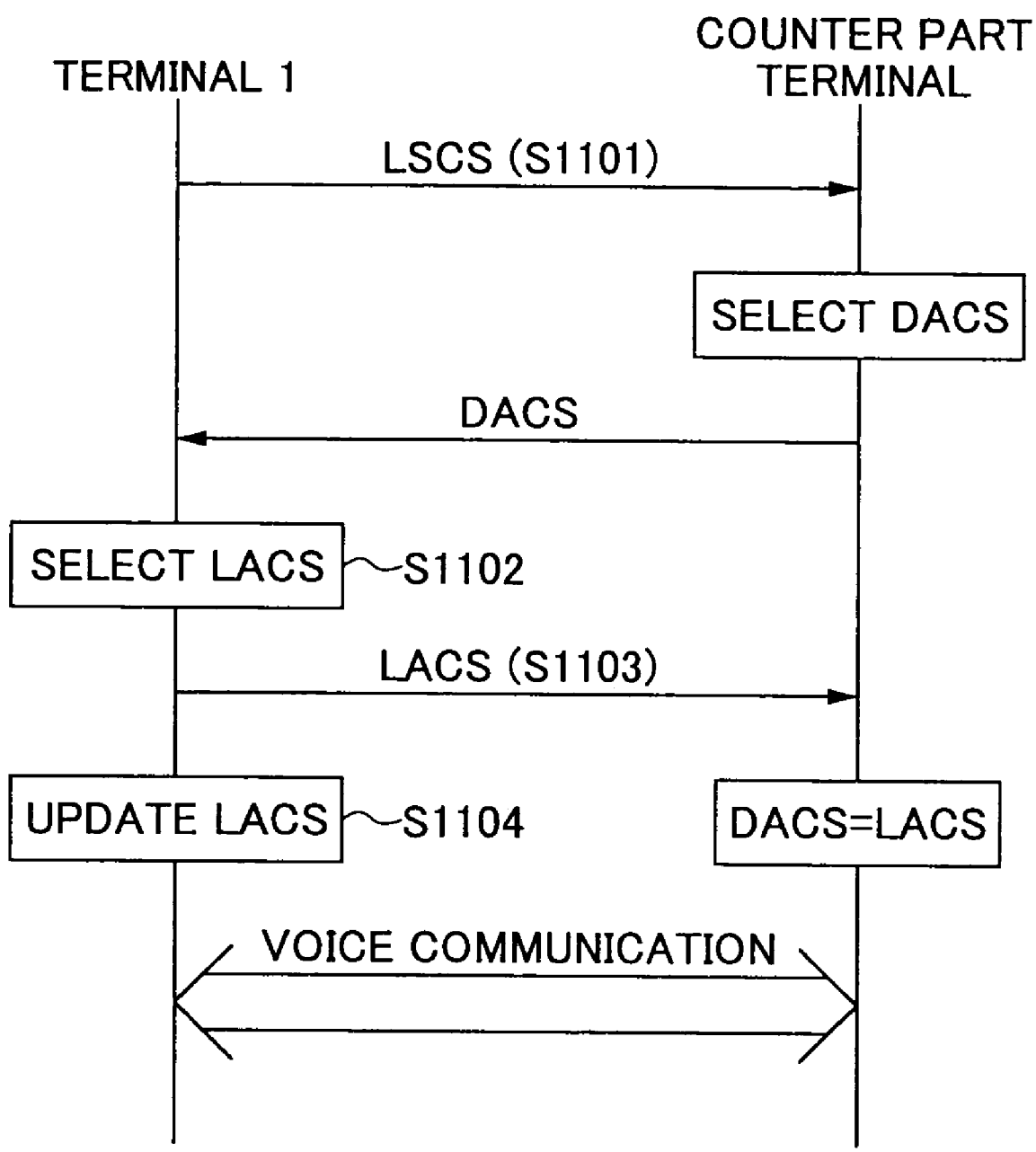
FIG. 11 is a sequence diagram of signal exchange between terminal 1 and a counterpart terminal, where terminal 1 makes a call.

The connection state 1 shown in FIG. 3 illustrates the situation where the coding modes supported by terminal 1 and the coding modes supported by terminal 2 are limited, and where the maximum number of modes available on the network is also limited (see FIG. 11). In this situation, terminal 1 cannot receive signals from terminal 2 if the signals are coded by mode 1 or mode 2. However, by conducting negotiation between terminal 1 and terminal 2 according to the coding standard selecting method shown in the flowchart of FIG. 5, LACS can be brought into agreement with DACS, as illustrated in FIG. 7. This is achieved because terminal 1 removes those modes (1 and 2 in this example) restricted on the network A from the DACS (modes 0, 1, 2, and 4) transmitted from terminal 2, and selects the remainder (modes 0 and 4 in this example) as the effective LACS to be activated.

By employing the algorithm (that is, the coding standard selecting method) of the above-described embodiment of the invention when a call is made between the END terminals, the conventional problem that a call can not be put through between terminals can be prevented even if some restriction occurs in the network (as in the connection state 1).

Figure 8:
FIG. 8 illustrates the negotiation result carried out between terminals in connection state 2 shown in FIG. 4 according to the coding standard selecting method of the embodiment of the invention.

FIG. 8 illustrates the negotiation result carried out between terminal 1 and terminal 2 in the connection state 2 shown in FIG. 4, based on the coding standard selecting method according to an embodiment of the invention.

Figure 12:
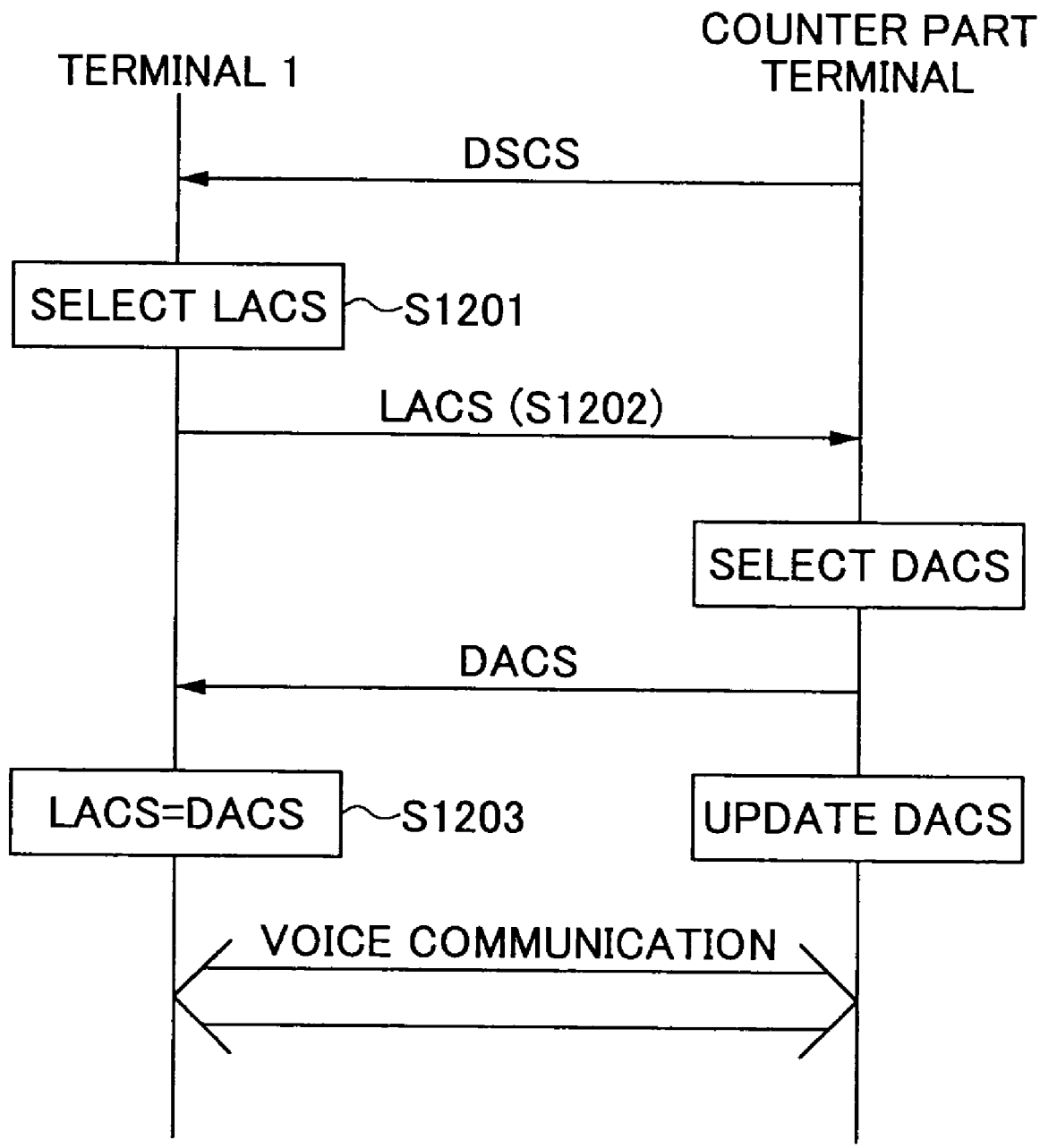
FIG. 12 is a sequence diagram of signal exchange between terminal 1 and a counterpart terminal, where the counterpart terminal makes a call.

The connection state 2 shown in FIG. 4 illustrates the situation where each of the terminals 1 and 2 supports all the coding modes, but the coding modes supported by the network A and network B are limited, and where the maximum number of modes available on the network is also limited (this example also corresponds to the negotiation sequence shown in FIG. 12). In this situation, terminal 2 cannot receive signals from terminal 1 if the signals are coded by mode 3 or mode 5 because network B does not support mode 3 or mode 5. However, by conducting negotiations between terminal 1 and terminal 2 according to the coding standard selecting method shown in the flowchart of FIG. 5, LACS can be matched with DACS, as illustrated in FIG. 8.

Among DSCS transmitted from terminal 2 via network B and containing five modes 0, 1, 2, 4, and 7 due to the support ability of network B, four modes 0, 1, 2, and 4 are selected at network B taking into account the common part with network A. Then, the coding modes (0 and 4) currently restricted at network A are removed from the four modes, and two modes (mode 1 and mode 2) are selected as an effective LACS that contains active code sets.

By applying the algorithm (that is, the coding standard selecting method) of the above-described embodiment to connection between the END terminals, the conventional problem that a call cannot be put through between terminals can be prevented even if some coding modes are restricted as in the connection state 2.

Figure 9:
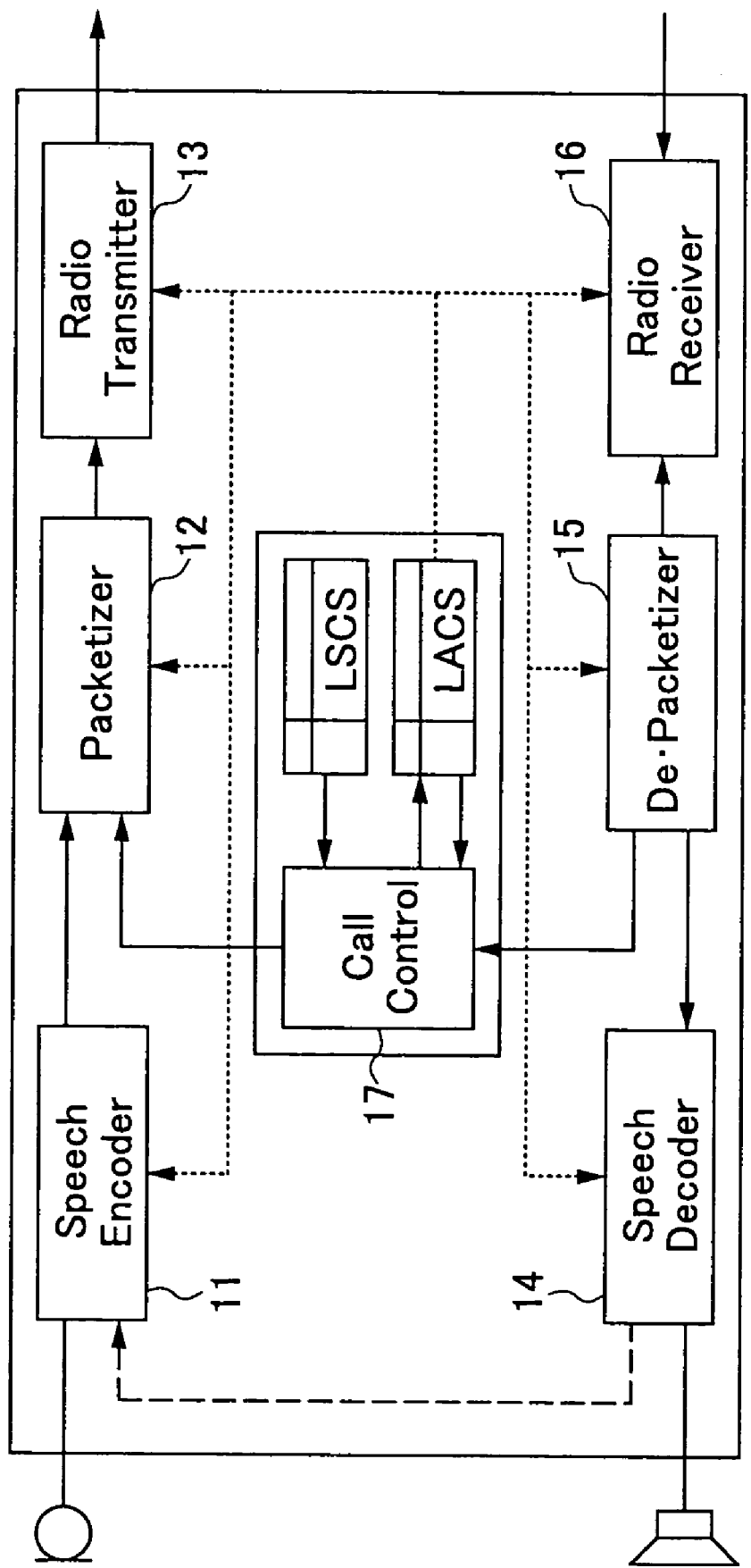
FIG. 9 illustrates the structure of the terminal device according to an embodiment of the invention.

FIG. 9 illustrates the structure of the terminal device according to an embodiment of the invention.

The terminal device illustrated in FIG. 9 has a speech encoder 11, a packetizer 12, a radio transmitter 13, a speech decoder 14, a depacketizer 15, a radio receiver 16, and a call controller 17.

The radio transmitter 13 modulates a packet supplied from the packetizer 12 to convert the packet into a radio signal, and transmits the radio signal a radio circuit. If the terminal device is an IP terminal, it may have an ordinary transmitter without a radio signal processing function. The radio receiver 16 demodulates the radio signal received from the radio circuit, and supplies the demodulated signal packet to the depacketizer 15. Packetizer 12 packetizes information (for example, speech (voice) information) supplied from the speech encoder 11 and information from the call controller 17. Depacketizer 15 depacketizes the packet supplied from the radio receiver 16, and extracts information. The extracted information is supplied to call controller 17 and speech decoder 14. Speech encoder 11 carries out digital compression of an input speech signal with a predetermined technique, according to the coding mode requested by a counterpart terminal device. Speech decoder 14 decodes the compressed digital speech signal received and extracted from the packet. At the same time, the speech decoder 14 informs the speech encoder 11 of the coding mode requested by the counterpart terminal device. Call controller 17 determines a coding mode (ACS) used for telecommunications with the network and the counterpart terminal device.

Figure 10:
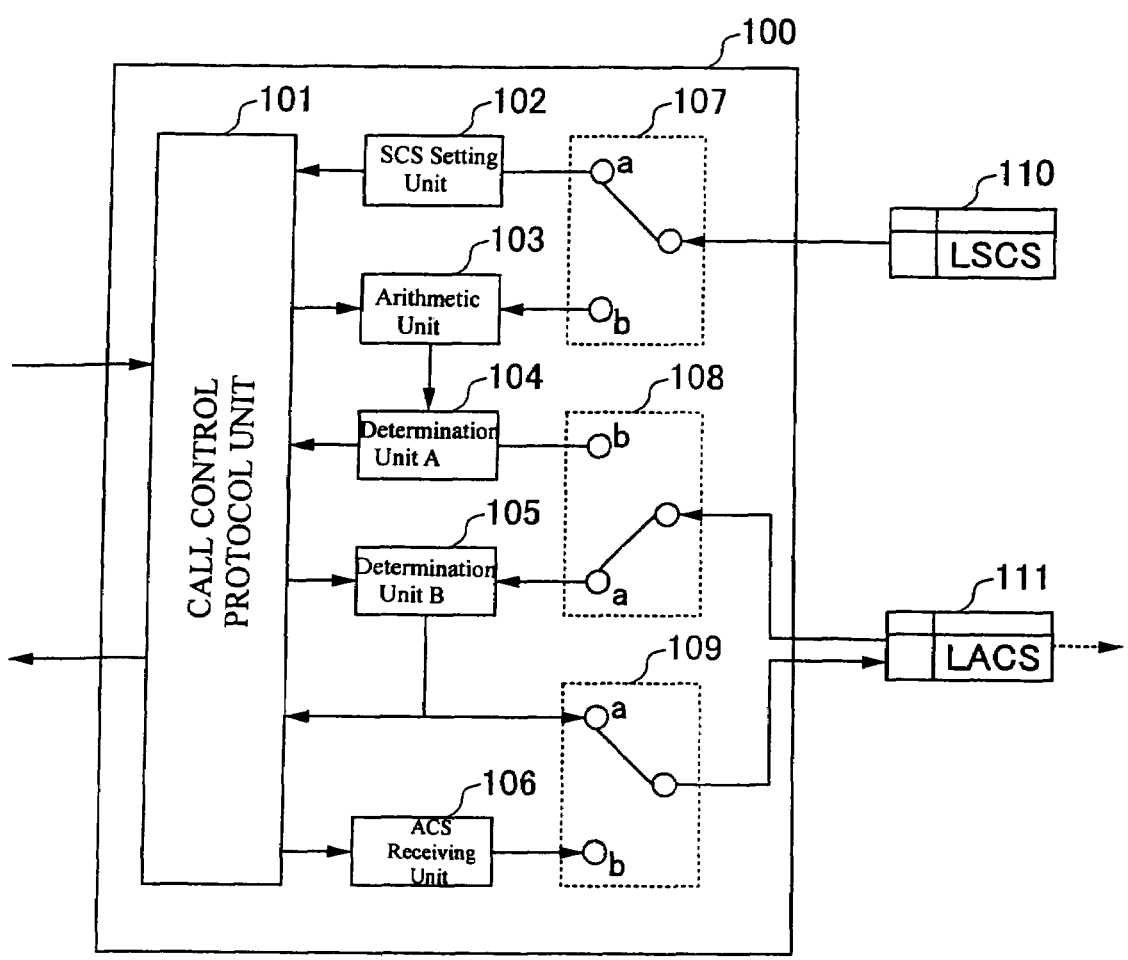
FIG. 10 is a diagram showing the functional blocks of the call controller of the terminal 1 shown in FIG. 9.

FIG. 10 illustrates functional blocks of the call controller 17.

The call controller 17 has the following components:
(1) Call control protocol unit 101
(2) SCS setting unit 102
(3) Arithmetic unit 103 for acquiring a common part between LSCS and received SCS
(4) Determination unit A 104 for determining a coding mode based on the common part and LACS
(5) Determination unit B 105 for determining a coding mode based on LACS and received ACS
(6) ACS receiving unit 106
(7) Switch A 107

(8) Switch B 108
(9) Switch C 109
(10) LSCS (coding modes supported at this terminal) storing unit 110
(11) LACS (coding modes currently available at this terminal) storing unit 111

Next, the operations of terminal 1 having the call controller 17 will be explained, with reference to FIG. 10 and FIG. 11 that illustrate signal sequences between terminal 1 and a counterpart terminal.

In this example, terminal 1 makes the call to the counterpart terminal. When terminal 1 makes a call, each of the switches 107, 108 and 109 provided in the call controller 17 is connected to its respective node a.

In FIG. 10, the SCS setting unit 102 reads LSCS stored in the LSCS storing unit 110, and supplies the LSCS to call control protocol unit 101. The call control protocol unit 101 attaches the LSCS to a control signal. The terminal 1 transmits this control signal to the counterpart terminal (step S1101 of the sequence diagram of FIG. 11).

Then, the call control protocol unit 101 receives a response signal containing a set of coding modes currently available at the counterpart terminal (i.e., DACS representing active coded sets at the counterpart terminal), and supplies the coding mode set DACS to the determination unit B 105.

The determination unit B 105 determines a coding mode set to be used to conduct voice communication, based on DACS transmitted from the counterpart terminal and LACS read out from the LACS storing unit 111 (step S1102 in FIG. 11). In this determination, common coding modes may be obtained from DACS and LACS, or alternatively, the maximum number of coding modes actually available at terminal 1 may be selected from the received coding mode set DACS. The determination unit B 105 supplies the coding modes of the determination result to the call control protocol unit 101, and at the same time, supplies them to the LACS storing unit 111 via switch C 109.

The call control protocol unit 101 attaches the coding mode set determined by the determination unit B 105 to a control signal. This control signal is transmitted from terminal 1 to the counterpart terminal (step S1103 in FIG. 11). The LACS storing unit 111 updates the contents of LACS based on the coding mode set determined and supplied via switch C 109 (step S1104 in FIG. 11). The LACS storing unit further sets information about encoding, packetization, and a radio circuit.

In this manner, when LACS is updated in terminal 1, voice communications with the counterpart terminal is started.

Below, the operations of terminal 1 carried out in the situation where the counterpart terminal makes a call to terminal 1 is explained, with reference to the block diagram of FIG. 10 and the sequence diagram of FIG. 12.

When the counterpart terminal makes a call to terminal 1, all the switches 107, 108 and 109 provided in the call controller 17 are connected to node b.

In FIG. 10, the call control protocol unit 101 receives a call control signal transmitted from the counterpart terminal, and supplies the mode set (DSCS) contained in the control signal to the arithmetic unit 103. The arithmetic unit 103 obtains a common part between DSCS supplied from the call control protocol unit 101 and LSCS read from the LSCS storing unit 110. The arithmetic result indicating the common part is supplied to the determination unit A 104.

The determination unit A 104 determines a coding mode set available for voice communication, based on the common part and LACS read out from the LACS storing unit 111 (step S1201 in FIG. 12). In this determination, a common term may be obtained as the available mode set from the common part and LACS, or alternatively, the maximum number of coding modes actually available at terminal 1 may be selected from the common part. The determination unit A 104 supplies the coding modes of the determination result to the call control protocol unit 101.

The call control protocol unit 101 attaches the coding mode set (LACS) determined by the determination unit A 104 to a control signal. This control signal is transmitted from terminal 1 to the counterpart terminal (step S1202 in FIG. 12). When terminal 1 receives a response from the counterpart terminal, which response contains the coding mode set DACS selected by the counterpart terminal, the call control protocol unit 101 supplies the mode set DACS to the ACS receiving unit 106. The ACS receiving unit 106 then supplies the mode set DACS to the LACS storing unit 111 via switch C 109. The LACS storing unit 111 updates the contents of the LACS using the received DACS (step S1203 in FIG. 12). The LACS storing unit 111 further sets information about encoding, packetization, and a radio circuit. In this manner, when LACS is updated in terminal 1, voice communication with the counterpart terminal is started.

The LACS may be set to a default value at the initial stage, or alternatively, nothing is set for LACS. In the latter case, the maximum number of modes that can be used is supplied to the determination unit A 104 or B 105.

With the above-described embodiment, the switches A-C (107-109) of the call controller 17 are operated between nodes "a" and "b" depending on which terminal (terminal 1 or the counterpart terminal) makes a call. In either case, negotiations are carried out between the terminals to select an appropriate coding mode suitable for both terminals. This arrangement can avoid the undesirable conventional problem that telecommunications, including voice communications, cannot be held due to inconsistency between the set of coding standards used on the transmitting side and the set of coding standards used on the receiving side.

Figure 13:
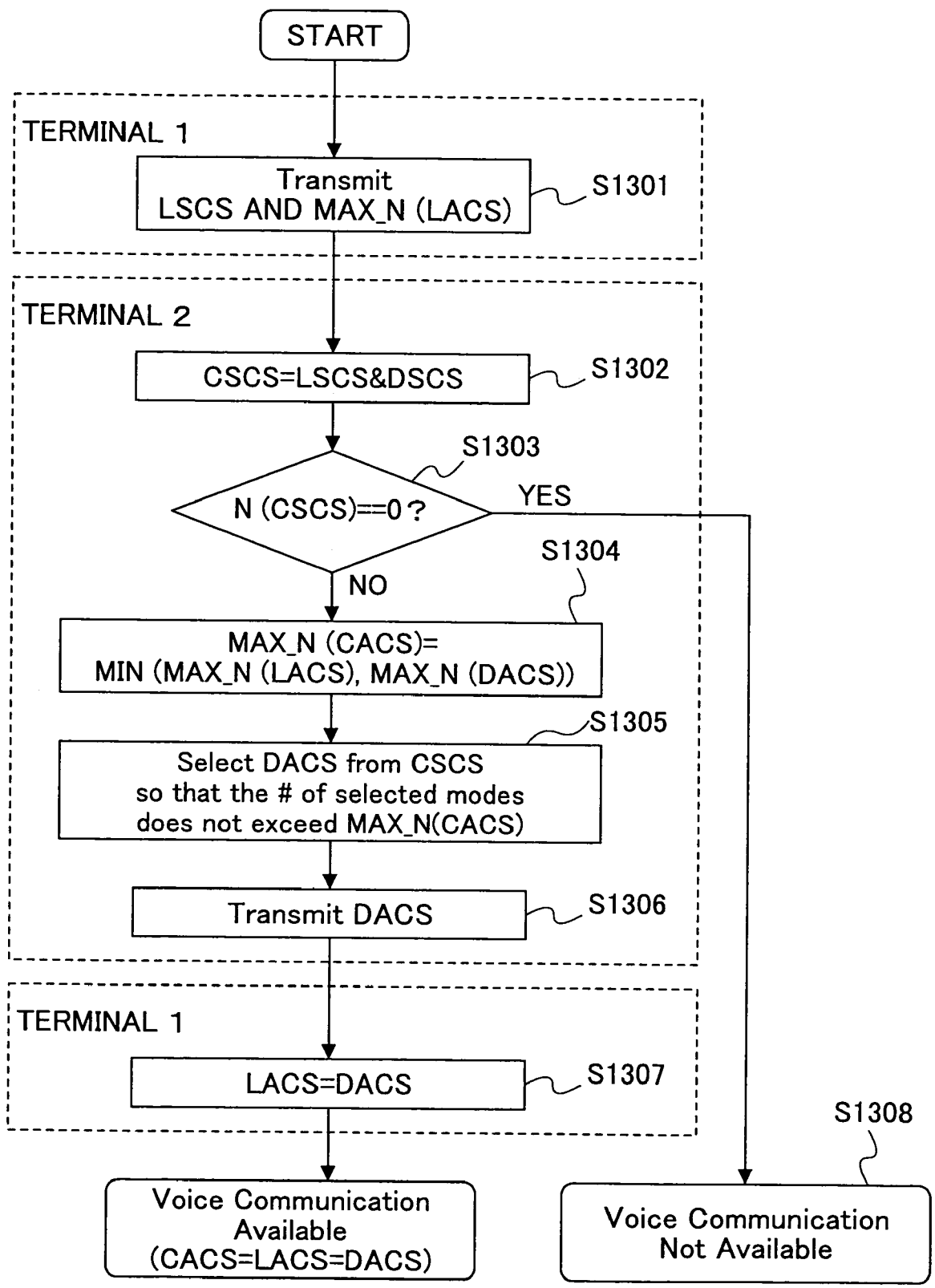
FIG. 13 is a flowchart showing the operation flow of the coding standard selecting method according to another embodiment of the invention.

FIG. 13 illustrates an operation flow of the coding standard selection method according to another embodiment of the present invention. In the embodiment shown in FIG. 13, terminal 1 transmits the maximum number of currently available modes (MAX_N(LACS)) at terminal 1, as well as all the coding mode supported at terminal 1 (LSCS), to terminal 2. In the flowchart, the symbol MIN_N( ) denotes the smallest number of coding modes contained in the codec sets defined in the parenthesis.

First, in step S1301, terminal 1 transmits a signal, which represents all the coding modes supported by terminal 1 itself (LSCS) and the maximum number of modes currently available at terminal 1 (MAX_N(LACS)), to terminal 2.

Steps S1302, S1303, and S1308 carried out in terminal 2 are the same as steps S2, S3, and S13 shown in FIG. 5, and the explanation for them is omitted.

In step S1304, terminal 2 selects the smaller one of the maximum number of currently available modes at terminal 1 (MAX_N(LACS)) and the maximum number of currently available modes at terminal 2 (MAX_N(DACS)). The selected number of modes is set in the common coding set (CACS) used for telecommunications between terminal 1 and terminal 2.

In step S1305, terminal 2 selects coding modes as many as the selected (smaller) number, from among the coding mode set (CSCS) supported in common by terminal 1 and terminal 2. DACS is set equal to the set of selected coding modes, which represents the coding mode set currently available at terminal 2. The DACS is transmitted to terminal 1 in step S1306.

In step S1307, terminal 1 uses the received DACS as it is, as the mode set LACS representing coding modes currently available at terminal 1, unlike in the previous embodiment.

In other words, in this embodiment, the DACS selected at S1305 by terminal 2 becomes as it is the final set of coding modes used for telecommunications between terminal 1 and terminal 2. Consequently, transmission of the third signal from terminal 1 to terminal 2 (see step S10 in FIG. 5) is eliminated.

In this embodiment, the operation flow is simplified because the maximum number of modes currently available at terminal 1 has already been taken into account at the time of selection of DACS by terminal 2 in step S1305, and therefore, the number of DACS transmitted to terminal 1 is always at or below MAX_N(LACS).

Although the above-described embodiments have been described exemplifying a VoIP telecommunication system for conducting voice communication based on speech coding and packetization, the present invention is not limited to these examples. The present invention is applicable to a communication system for transmitting a speech signal without packetization, or a communication system of a circuit switching type that allows end terminals to communicate with each other via a network with a circuit switching function.

In the above-described embodiments, the radio transmitter 13 of the terminal device corresponds to the first, the second, and the third signal transmission means, and the call controller 17 corresponds to the coding standard selection means of the first terminal and the second terminal.

As has been described above, with the present invention, a set of coding modes that can be actively used at the first terminal is selected from a common part of the coding modes supported by both the first terminal and the second terminal, and LACS can be consistent with DACS. Consequently, a call can be put through between the first terminal and second terminal in a reliable manner, and a stable telecommunication service can be offered to the end users.

The invention claimed is:

1. A coding standard selecting method for selecting a coding standard used for communications between a first terminal and a second terminal, each of the first and second terminals supporting a plurality of coding standards, wherein:

the first terminal transmits a first signal representing all the coding standards supported by the first terminal to the second terminal;

the second terminal selects a set of coding standards that satisfy a predetermined condition from among all the coding standards that are supported by the second terminal and the coding standards represented by the first signal, and transmits a second signal representing the selected set of coding standards to the first terminal; and the first terminal selects a coding standard available for communication with the second terminal from among the set of coding standards represented by the second signal, and transmits a third signal representing the selected coding standard to the second terminal.

2. The coding standard selecting method according to claim 1, wherein:

when receiving the first signal from the first terminal, the second terminal selects at least one coding standard, as the coding standard that satisfies said predetermined condition, from a set of common coding standards that are in common between the coding standards supported by the second terminal and the coding standards represented by the first signal.

3. The coding standard selecting method according to claim 1, wherein:

the first terminal selects at least one coding standard, as the coding standard available for communication with the second terminal, from the coding standards represented by the second signal.

4. A coding standard selecting method for selecting a coding standard used for communications between a first terminal and a second terminal, each of the first and second terminals supporting a plurality of coding standards, wherein:

the first terminal transmits a first signal representing all the coding standards supported by the first terminal and the maximum number of currently available coding standards to the second terminal;

the second terminal selects common coding standards that are in common between the coding standards represented by the first signal and all the coding standards supported by the second terminal itself, so that the number of the common coding standards does not exceed the maximum number of currently available coding standards of the first terminal, and transmits a second signal representing the selected common coding standards; and the first terminal employs the common coding standards represented by the second signal for communication with the second terminal.

5. A first terminal device that communicates with a second terminal device, comprising:

first signal transmission means that transmits a first signal representing all coding standards supported by the first terminal device itself to the second terminal device; and second signal transmission means that selects one of the coding standards that is to be used for communication with the second terminal device from among a second set of coding standards represented by a second signal transmitted from the second terminal device in response to the first signal, and transmits a third signal representing the selected coding standard to the second terminal device.

6. The first terminal device according to claim 5, wherein the second signal transmission means has first terminal coding standard selection means that selects at least one of the coding standards to be used for communication with the second terminal device from among the second set of coding standards represented by the second signal.

7. The first terminal device according to claim 5, wherein the first signal represents the maximum number of the coding standards currently available at the first terminal device, in addition to all the coding standards supported by the first terminal device itself; and the second signal transmission means employs all the coding standards represented by a second signal transmitted from the second terminal device, as the coding standard that is to be used for communication with the second terminal device.

8. A second terminal device that conducts communications with a first terminal device, comprising:

second signal transmission means that selects a second set of coding standards that satisfies a predetermined condition from among all the coding standards supported by the second terminal device itself and among a first set of coding standards represented by a first signal transmitted from the first terminal device such that the number of the selected common coding standards does not exceed a maximum number of coding standards currently available at the first terminal device, the maximum number of coding standard being represented by the first signal, and transmits a second signal representing the second set of coding standards to the first terminal device.

9. The second terminal device according to claim 8, wherein the second signal transmission means has second terminal coding standard selection means that selects at least one coding standard from common coding standards that are in common between the first set of coding standards represented by the first signal transmitted from the first terminal device and all the coding standards supported by the second terminal device itself, as the second set of coding standards that satisfies the predetermined condition.

10. A terminal device comprising:

a receiver that receives a signal representing all coding standards supported by a counterpart terminal device with which the terminal device is going to start communicating;

a selector that selects at least one coding standard from common coding standards in common between said coding standards supported by the counterpart terminal device and coding standards supported by the terminal device itself so as not to exceed a maximum number of coding standards currently available at the counterpart terminal device;

a signal generator that generates a signal representing said at least one coding standard selected by the selector; and a transmitter that transmits the signal generated by the signal generator to the counterpart terminal device.

11. A terminal device comprising:

a receiver that receives a signal representing all coding standards supported by a counterpart terminal device with which the terminal device is going to start communicating and the maximum number of coding standards currently available at the counterpart terminal device;

a selector that selects common coding standards that are in common between coding standards supported by the terminal device itself and the coding standards supported by the counterpart terminal device, so that the number of the common coding standards does not exceed said maximum number of coding standards;

a signal generator that generates a selection signal representing the common coding standards selected by the selector; and a transmitter that transmits the selection signal to the counterpart terminal device.

* * * * *